June 15, 1926.

E. E. HOLT

TIRE VALVE AND THE LIKE

Filed March 7, 1925

1,588,457

Inventor:
Edward E. Holt
by
Attys

Patented June 15, 1926.

1,588,457

UNITED STATES PATENT OFFICE.

EDWARD E. HOLT, OF CHICAGO, ILLINOIS, ASSIGNOR TO EDWARD HOLT CO., OF CHICAGO, ILLINOIS, A CORPORATION OF ILLINOIS.

TIRE VALVE AND THE LIKE.

Application filed March 7, 1925. Serial No. 13,692.

This invention relates to improvements in tire valves and the like. The valve of the present invention has been devised with a view particularly to meet the requirements of valves for pneumatic tires, but will presently appear that valves embodying the features of the present invention may also be used for many other classes of service.

One object of the invention is to provide a tire valve which entirely eliminates the need of using springs or the like for moving the valve plug into the sealing position. In this connection, it is a further object to make provision for sealing the valve so firmly and under such conditions as to make it practically impossible for air to leak out of the tire.

A further object of the invention is to provide a valve construction such that a rubber tipped plug may be very conveniently used in conjunction with a tapering valve seat to establish the sealing of the air within the tire.

A further object of the invention is to provide a construction such that when it is desired to inflate the tire, the valve plug may be moved away from the seat by the operator, while at the same time maintaining the valve itself effectively sealed against any leakage of air during this operation. This will make it possible to move the plug into the inflating position, and will also make it possible to restore the plug to the fully sealed position without any loss of air in either operation.

A further object of the invention is to provide an arrangement such that when the plug has been fully moved into the inflating position it will come to a bearing against another definite valve seat, with which it will assume and maintain sealing engagement until again moved away from such seat by a definite operation of the operator or by the incoming air of inflation.

A further object of the invention is to provide a construction of valve which is very simple and can be very cheaply made by machine operations of very inexpensive nature.

Other objects and uses of the invention will appear from a detailed description of the same, which consists in the features of construction and combinations of parts hereinafter described and claimed.

Figure 4:
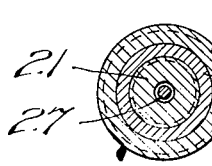
Figure 5:
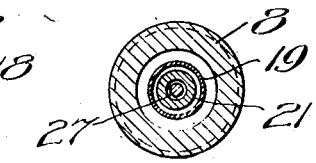
Figure 6:
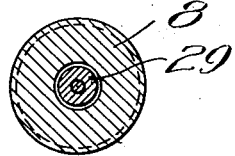
Figure 7:
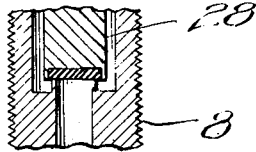

Figs. 4, 5 and 6 show cross sections on the lines 4—4, 5—5, and 6—6, respectively, looking in the direction of the arrows; and Fig. 7 shows a fragmentary view through a modified construction of valve seat.

The valve stem is designated in each instance by the numeral 8. Its lower end is intended to be attached to the inner tube 9 by means of the nuts 10 and 11 in the usual manner.

Figure 1:
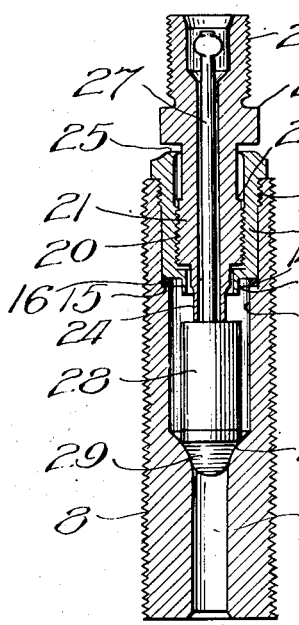
Figure 1 shows a longitudinal section through a tire valve embodying the features of the present invention, the plug being forced down into the fully sealed position.
Figure 2:
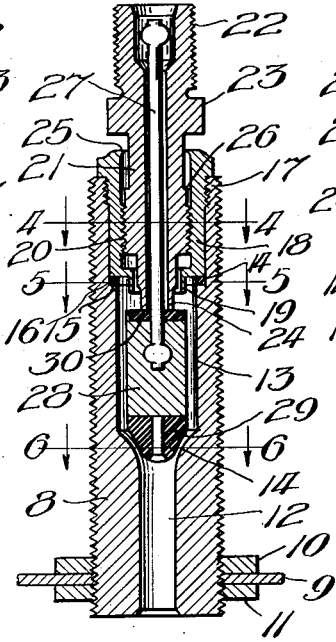
Fig. 2 shows a view similar to that of Fig. 1, with the exception that the plug has been partially retracted towards the inflating position.
Figure 3:
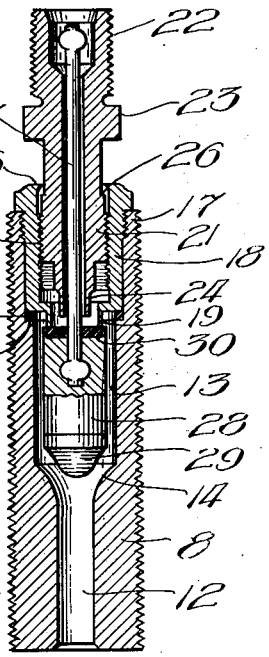
Fig. 3 shows a view similar to those of Figs. 1 and 2, with the exception that the plug has been fully retracted to the inflating position.

The stem 8 is provided in its lower portion with a longitudinal bore 12, the upper end of which communicates directly with a chamber bore 13 at the position of a valve seat 14. The chamber 13 is enlarged at a position substantially midway of its height to establish a gasket seat 15, as clearly shown in Figs. 1, 2 and 3. A circular gasket 16 of rubber or other suitable material is intended to be set into place at this point.

The upper end of the chamber opening 13 is internally threaded, as shown at 17, to receive a collar 18 which may be threaded into place. The lower portion of this collar is inwardly turned and is then again formed downwardly to provide a flange 19 which serves to establish a circular downwardly facing valve seat. When the collar is threaded into place it comes firmly against the gasket 16 so as to establish a sealing connection therewith.

The collar is internally threaded at 20 and a neck 21 reaches through the collar and engages the threads thereof, as clearly shown in the different figures. The upper portion of this neck preferably terminates in an externally threaded stem 22 which may receive the coupling of an air hose, and beneath said threaded portion there is preferably provided a milled head 23 by means of which the neck may be conveniently turned.

The lower portion of the neck is of contracted size and terminates in a downwardly depending flange 24 which establishes a valve seat of smaller size than the valve seat 19. The parts are so proportioned that when the neck is fully moved inwardly the valve seat 24 reaches a substantial distance below the valve seat 19, whereas when the neck is fully raised the seat 24 draws up through and above the valve seat 19. The extreme upper end of the collar 18 is preferably beaded inwardly, as shown at 25, so as to engage a shoulder 26 of the neck, and thus prevent the neck from being fully removed after the parts have been fully assembled.

The neck is provided with a longitudinal bore through which there reaches a stem 27. Said stem is of sufficiently smaller size than the bore to allow inflow or escape of air, as the case may be. The lower end of the stem 27 carries a valve plug 28. This preferably comprises a metal body to which the stem 27 is directly connected, and sealing ends 29 and 30 which establish the actual contact with the valve seats for sealing purposes. The portion 29 preferably comprises a small tapered rubber block or tip riveted to the lower end of the plug 28; and the portion 30 preferably comprises a disk of rubber or other yieldable material seated into a circular recess in the upper end of the plug 28. The tip portion 29 is adapted to wedge into the tapering valve seat 14 when the neck 21 is forced down, and the plug 30 is adapted to sealingly engage either of the circular valve seats 19 and 24, as the case may be, depending upon the exact position of the neck. When the neck is forced clear down to the position of Fig. 1, the valve seat 24 engages the disk 30 and upon raising the neck, this engagement will continue until the valve seat 24 has been raised high enough to allow the disk 30 to come against the fixed valve seat 19. Further movement of the neck will draw its seat 24 away from the disk 30, as is clearly evident from Fig. 3.

When it is desired to deflate the tire, the neck 21 is raised so as to carry the plug 28 away from sealing engagement with the seat 14, and then by pressing down on the upper end of the stem 27, the valve seat 30 is disengaged from either the seat 24 or the seat 19, as the case may be, so as to allow escape of air up through the neck and past the stem.

In some cases it may be desirable to make use of a flat valve seat at the lower end of the plug 28 and of form similar to the valve seat at the upper end of said plug. I have, therefore, shown in Fig. 7 a modification in which the valve stem 8 is provided with an upwardly facing annular seat 31, and in this modification the plug 28 is provided on its lower face with a disk of rubber or other suitable material 32.

While I have herein shown and described only certain embodiments of the features of my present invention, still I do not intend to limit myself to the same, except as I may do so in the claims.

I claim:

1. A pneumatic valve for the purpose specified comprising in combination a valve stem having a longitudinally extending through bore suitably formed to provide a central valve chamber having an outwardly facing annular valve seat at its inner end, a collar in the outer end of the bore, an inwardly facing valve seat on the inner end of said collar, a neck threaded through the collar and provided with a longitudinal bore, an inwardly facing valve seat on the inner end of said neck, a valve plug in the central valve chamber having a valve surface at each end, the valve surface at the inner end of the plug being adapted to engage the outwardly facing valve seat of the valve stem, and the valve surface at the outer end of the plug being adapted to engage either the valve seat of the collar or the valve seat of the neck depending on the position of the neck within the collar, substantially as described.

2. A pneumatic valve for the purpose specified comprising in combination a valve stem having a longitudinally extending through bore suitably formed to provide a central valve chamber having an outwardly facing annular valve seat at its inner end, means establishing an inwardly facing valve seat at the outer end of said chamber, a neck reaching into said central valve chamber and provided with a longitudinal bore and having an inwardly facing valve seat at its inner end, a valve plug in the central valve chamber having a valve surface at each end, the valve surface at the inner end of the plug being adapted to engage the outwardly facing valve seat aforesaid and the valve surface at the outer end of the plug being adapted to engage either of the inwardly facing valve seats aforesaid depending on the position of the neck within the valve stem substantially as described.

3. A pneumatic valve for the purpose specified comprising in combination a valve stem having a longitudinally extending through bore suitably formed to provide a central valve chamber having a fixed valve seat at its inner end, means for establishing a fixed valve seat at the outer end of said chamber, said valve seats facing each other, a valve plug in the valve chamber, having a valve surface at each end, the valve surface at the inner end of the plug being adapted to engage the adjacent valve seat of the valve stem and the valve seat at the outer end of the plug being adapted to engage the adjacent fixed valve seat aforesaid, a shiftable inwardly facing valve seat within the outer end of the chamber adapted to engage the valve seat of the outer end of the plug when said shiftable seat is shifted inwardly a sufficient distance with respect to the fixed valve seat at the outer end of the chamber, means reaching to the outside of the valve stem for shifting said shiftable valve seat, and means in conjunction with the valve plug reaching to the outside of the valve stem operable to shift the position of the valve plug from one seat to the other, substantially as described.

EDWARD E. HOLT.